United States Patent [19]

Mathews et al.

[11] Patent Number: 5,359,723
[45] Date of Patent: Oct. 25, 1994

[54] CACHE MEMORY HIERARCHY HAVING A LARGE WRITE THROUGH FIRST LEVEL THAT ALLOCATES FOR CPU READ MISSES ONLY AND A SMALL WRITE BACK SECOND LEVEL THAT ALLOCATES FOR CPU WRITE MISSES ONLY

[75] Inventors: Gregory S. Mathews, Cupertino; Edward S. Zager, San Jose, both of Calif.

[73] Assignee: Intel Corporation, Santa Clara, Calif.

[21] Appl. No.: 808,108

[22] Filed: Dec. 16, 1991

[51] Int. Cl.⁵ .............................................. G06F 12/08
[52] U.S. Cl. .................. 395/425; 364/242.3; 364/243.45; 364/964.343
[58] Field of Search ........................................ 395/425

[56] References Cited

U.S. PATENT DOCUMENTS

| | | | |
|---|---|---|---|
| 4,933,835 | 6/1990 | Sachs et al. | 364/200 |
| 5,091,846 | 2/1992 | Sachs et al. | 395/250 |
| 5,191,649 | 3/1993 | Cadambi et al. | 395/200 |
| 5,241,641 | 8/1993 | Iwasa et al. | 395/425 |
| 5,247,642 | 9/1993 | Kadlec et al. | 395/425 |
| 5,253,353 | 10/1993 | Mogul | 395/425 |
| 5,261,066 | 11/1993 | Jouppi et al. | 395/425 |
| 5,276,836 | 1/1994 | Fukumaru et al. | 395/425 |

Primary Examiner—Joseph L. Dixon
Assistant Examiner—B. James Peikari
Attorney, Agent, or Firm—Blakely, Sokoloff, Taylor & Zafman

[57] ABSTRACT

A cache memory hierarchy having a first level write through cache memory and a second level write back cache memory is provided to a computer system having a CPU, a main memory, and a number of DMA devices. The first level write through cache memory responds to read and write accesses by the CPU, and snoop accesses by the DMA devices, whereas the second level write back cache memory responds to read and write accesses by the CPU as well as the DMA devices. Additionally, the first level write through cache memory is a relatively large cache memory designed to provide a high cache hit rate, whereas the second level write back cache memory is a relatively small cache memory designed to reduce accesses to the main memory. Furthermore, the first level write through cache memory reallocates its cache lines in response to CPU read misses only, whereas the second level write through cache memory reallocates its cache lines in response to CPU write misses only.

10 Claims, 5 Drawing Sheets

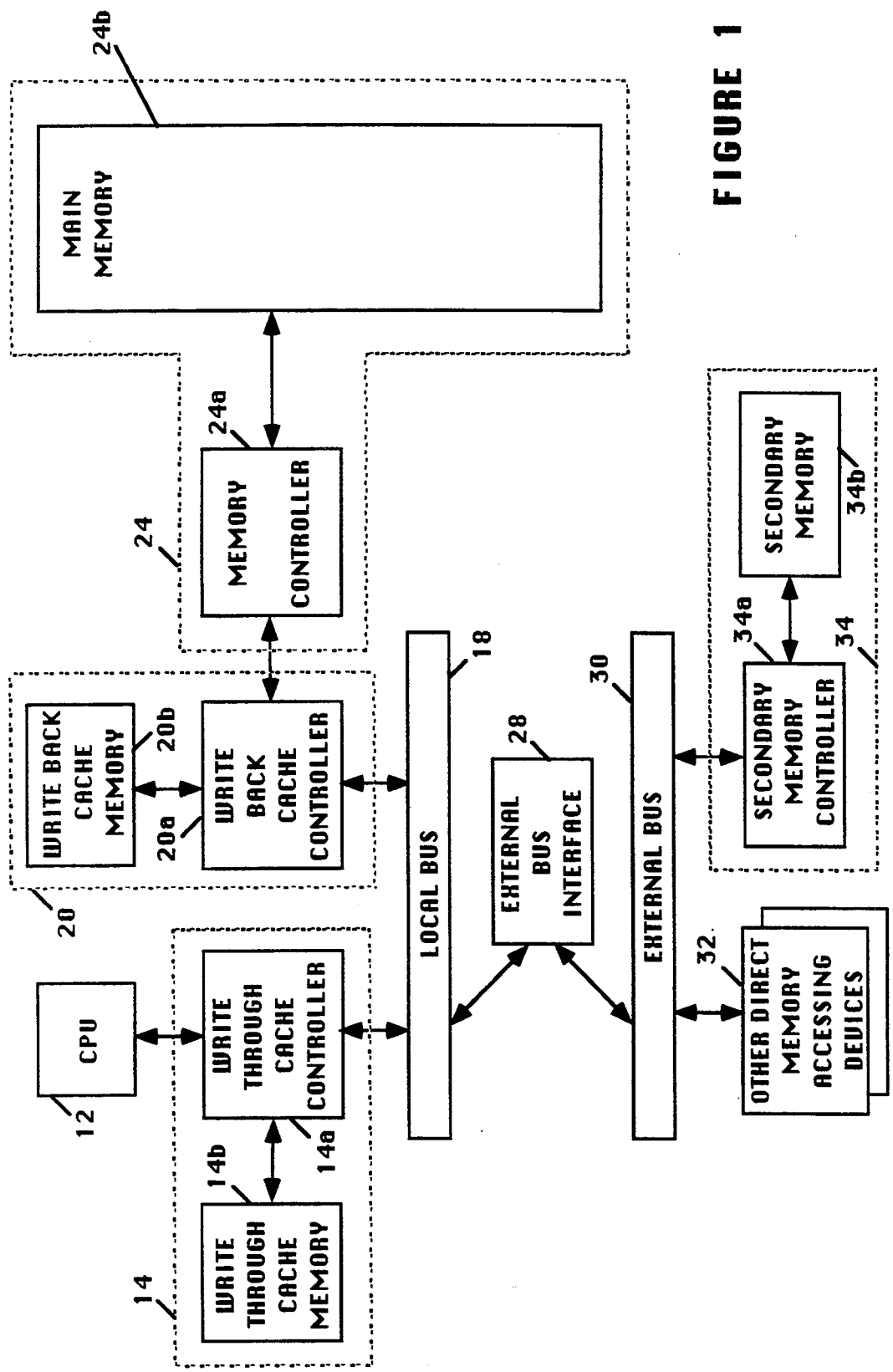

CACHE MEMORY HIERARCHY HAVING A LARGE WRITE THROUGH FIRST LEVEL THAT ALLOCATES FOR CPU READ MISSES ONLY AND A SMALL WRITE BACK SECOND LEVEL THAT ALLOCATES FOR CPU WRITE MISSES ONLY

BACKGROUND OF THE INVENTION

1. Field of the Invention

The present invention relates to the field of computer systems, in particular, microprocessor based portable computer systems. More specifically, the present invention is related to the cache memory on these computer systems.

2. Art Background

Typically the central processing unit (CPU) in a computer system, including the CPU in a microprocessor based portable computer system, operates at a substantially faster speed than the main memory of the computer system. Most computer systems provide cache memory which can operate at a higher speed than the main memory to buffer the data and the instructions between the main memory and the high speed CPU. At any particular point in time, the cache memory stores a subset of the data and instructions in main memory.

During read cycles, data and instructions are fetched from the cache memory if they are currently stored in the cache memory (read cache hits). Otherwise (read cache misses), they are retrieved from the main memory and stored in the cache memory as well as provided to the CPU. Similarly, during write cycles, data are written into the cache memory if they are currently stored in the cache memory (write cache hits). Otherwise (write cache misses), they are either not written into the cache memory (no write allocate) or written into the cache memory after forcing a cache line update (write allocate). Furthermore, data are written into the main memory either immediately (write through) or when a cache line is reallocated (write back).

As the speed of CPUs continues to get faster, various performance motivated approaches have been developed to make cache hits faster or reduce cache miss penalty, thereby further reducing CPU idle time and improving system performance. Well known examples are virtual addressing to make cache hits faster, early re-start and out-of-order fetching to reduce read miss penalty, use of write buffer to reduce write miss penalty, and use of two level caches to reduce read/write miss penalty. In the case of the two level cache approach, typically the first level cache is made small enough to match the clock cycle time of the CPU while the second level cache is made large enough to capture many fetches that would otherwise have to go to main memory.

For further description of cache memory, cache performance problems and improvement techniques, see J. L. Hennessy, and D. A. Patterson, *Computer Architecture—A Quantitative Approach,* pp. 402–461, (Morgan Kaufmann, 1990).

With the advent of microprocessor based portable computer systems, due to the importance of power consumption to these computer systems, the design of cache memory on these computer systems takes on a new dimension, since every access to main memory consumes power. If not for its complexity, write back cache memory would have been ideal for these computer systems, since it consumes less power by not accessing the main memory until a cache line is reallocated or as specified by the cache coherency protocol. Notwithstanding the additional accesses to main memory and therefore more power consumption, write through cache memory remains the favored approach for microprocessor based portable computer systems because of its simplicity in implementation, as compared to write back cache memory.

Thus, it is desirable to be able to reduce power consumption on a computer system, particularly on a microprocessor based portable computer system, without having to forsake the simple to implement write through cache memory. Therefore, it is desirable to reduce power consumption on a computer system having a write through cache memory by reducing write accesses to main memory. The reduction in write accesses to main memory is to be achieved in a manner such that the power consumption savings by reduced write accesses to main memory are not negated by offsetting increases in power consumption by additional hardware. It is further desirable that the reduction in write accesses to main memory and therefore power consumption is achieved with minimal increase in performance penalty. As will be disclosed, these and other desirable results are the objects achieved by the cache memoir hierarchy of the present invention.

SUMMARY OF THE INVENTION

Under the present invention, a computer system comprising main and secondary memory is provided with a cache memory hierarchy having a first level write through cache memory and a second level write back cache memory. The first level write through cache memory caches data/instruction of the main and secondary memory, whereas the second level write back cache memory caches data of the main memory. The first level write through cache memory is optimized to provide a high cache read hit rate for cache read cycles performed by the CPU, whereas the second level write back cache memory is optimized to complement the first level write through cache memory.

In particular, the first level write through cache memory is designed to be responsive to read and write cycles performed by the CPU. The first level write through cache memory is designed to reallocate its cache lines in response to read misses, but not for write misses. However, except for performing snoop cycles, the first level write through cache memory is designed to be unresponsive to both read and write cycles performed by other direct memory accessing devices. Additionally, the first level write through cache memory is set up to be n-way set associative.

The second level write back cache memory is designed to be responsive to read and write cycles performed by the CPU and other direct memory accessing devices. The second level write back cache memory is designed to reallocate its cache lines for write misses from write cycles performed by the CPU only, and not read misses from read cycles performed by the CPU, nor read/write misses from read/write cycles performed by the other direct memory accessing devices. Additionally, the second level write back cache memory is provided with cache lines having line size greater than or equal to the line size of the cache lines of the first level write through cache memory. Furthermore, the second level write back cache memory is kept relatively small as compared to the first level write through cache memory.

As a result, the desired results and objects of reducing accesses to main memory thereby reducing power consumption of computer systems, particularly microprocessor based portable computer system, without having to forsake simple to implement write through cache memory, nor having the power consumption savings negated by offsetting power consumptions incurred by increased hardware, nor having to incur significant performance penalty are achieved.

BRIEF DESCRIPTION OF THE DRAWINGS

The objects, features and advantages of the present invention will be apparent from the following detailed description of the preferred embodiment of the invention with references to the drawings in which FIG. 1 is a block diagram illustrating a computer system embodying the cache memory hierarchy of the present invention.

DETAILED DESCRIPTION OF THE PREFERRED EMBODIMENT

Figure 2A:
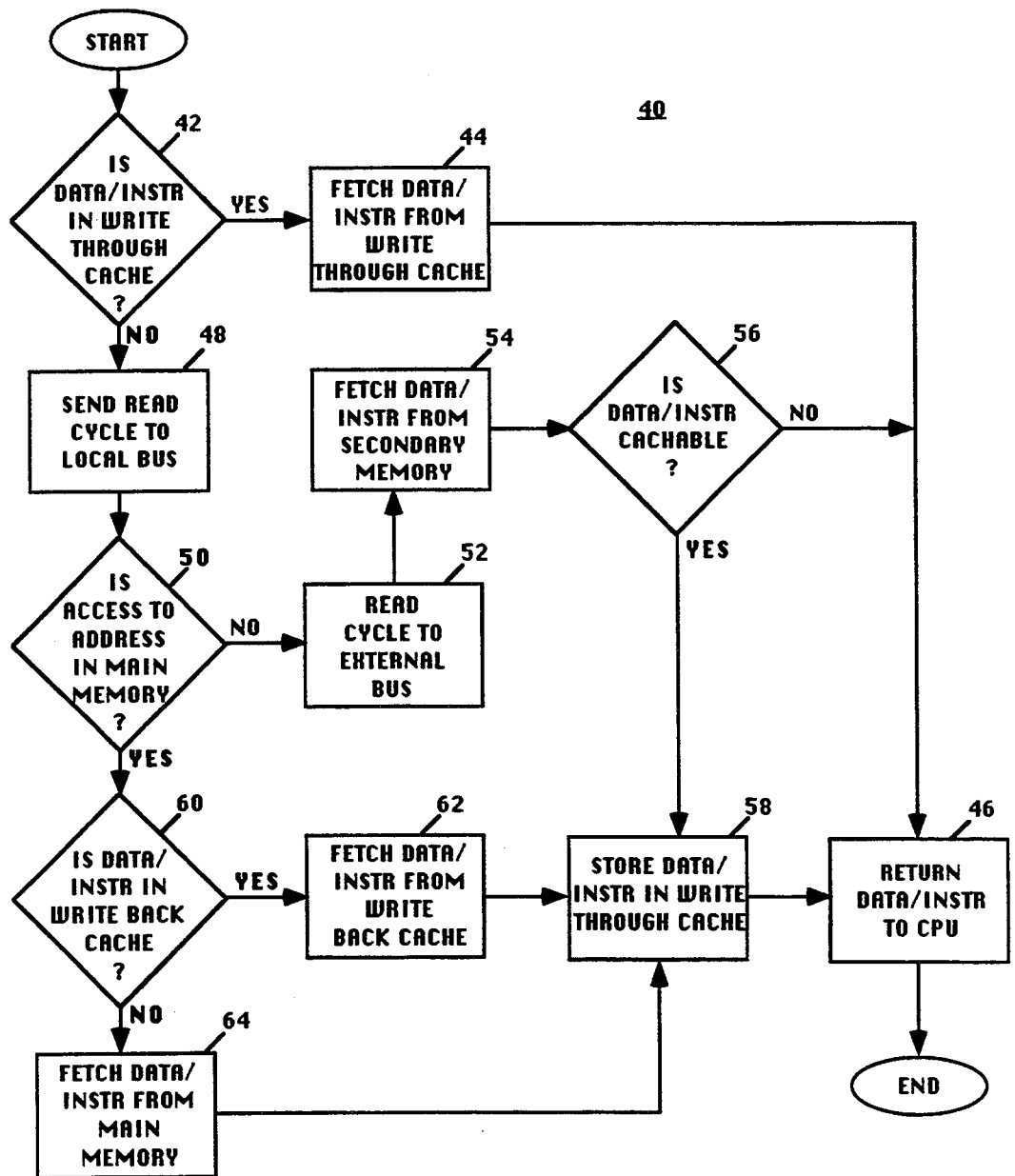
FIGS. 2a, 2b, 2c and 2d are block diagrams illustrating the operation flow of the cache memory hierarchy of the present invention.

A cache memory hierarchy that reduces power consumption of a computer system by reducing write accesses to main memory is disclosed which has particular application to microprocessor based portable computer systems. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring now to FIG. 1, a block diagram illustrating a computer system embodying the cache memory hierarchy of the present invention is shown. Shown is a central processing unit (CPU) 12 coupled to a first level write through cache memory unit 14 of the present invention which comprises a write through cache controller 14a and an array of cache memory 14b. The CPU 12 generates read and write cycles comprising source addresses for data to be read, and data to be written in conjunction with their corresponding destination addresses respectively. The CPU 12 is intended to represent a broad category of CPUs found in computer systems, including microprocessor based computer systems, whose constitution and basic functions are well known and will not be described in further detail here. The first level write through cache memory unit 14 of the present invention will be described in further detail below.

The first level write through cache memory unit 14 in turn through the write through cache controller 14a is coupled to a local bus 18. Attached to the local bus 18 is a second level write back cache memory unit 20 of the present invention comprising a write back cache controller 20a and an array of cache memory 20b. The local bus 18 is also intended to represent a broad category of buses or equivalent inter-component communication links found in computer systems, including microprocessor based computer systems, whose constitution and basic functions are well known and will not be described in further detail here. The second level write through cache memory unit 14 of the present invention will be described in further detail below.

The second level write back cache memory unit 20 is in turn coupled to a main memory unit 24 which comprises a main memory controller 24a and an array of main random access memory 24b. For ease of understanding the present invention, the main memory controller 24a is assumed to provide a static 1:1 mapping of local bus addresses to main memory addresses after system boot up; in other words, there is no dynamic remapping of local bus addresses by the main memory controller 24a. Furthermore, all main memory locations are assumed cacheable. However, it will be appreciated that the present invention may be practiced without the mapping of local bus addresses and the cacheability of main memory locations being supported in the manner assumed. Otherwise, the main memory unit 24 is also intended to represent a broad category of main memory found in computer systems, including microprocessor based computer systems, whose constitution and basic functions are well known and will not be described further here.

Also shown is an external bus 30 coupled to the local bus 18 via an external bus interface 28. The external bus interface 28 and the external bus 30 are also intended to represent a broad category of bus interfaces and buses, and equivalent inter-component communication links found in computer systems, including microprocessor based computer systems, whose constitution and basic functions are well known and will not be described further here.

Attached to the external bus 30 are other direct memory accessing devices 32. Similar to the CPU 12, the other direct memory accessing devices also generate read and write cycles comprising source addresses for data/instruction to be read and data to be written in conjunction with their corresponding destination addresses respectively. The other direct memory accessing devices 32 are also intended to represent a broad category of external peripheral devices found in computer systems, including microprocessor based computer systems. Particular examples include various types input/output (I/O) controllers. The constitution and basic functions of these other direct memory accessing devices 32 are also well known and will not be described further here.

Also attached to the external bus 30 is a secondary memory unit 34 comprising a secondary memory controller 34a and an array of secondary memory 34b. The secondary memory unit 34 is also intended to represent a broad category of memory found in computer systems, including microprocessor based computer systems, other than main memory. Particular example includes read-only memory. For secondary memory unit 34 comprising read-only memory, the read-only memory may be shadowed by an area of main memory 24b in the main memory unit 24. For ease of understanding the present invention, it is assumed that only the CPU 12 may change shadowed memory, and such change may be made only after the shadowed memory has been declared writeable again. However, it will be appreciated that the present invention may be practiced without the changing of shadow memory being supported in the assumed manner. Otherwise, the constitution and basic functions of secondary memory 34 are also well known and will not be described further here.

Additionally, for ease of understanding the present invention, read cycles performed by the CPU 12 against shadowed read-only memory are considered to be performed against the main memory unit 24, whereas write cycles performed by the CPU 12 against shadowed read-only memory are considered to be performed against the secondary memory unit 34. Cycles performed by other direct memory accessing devices 32 against shadowed read-only memory are considered to be performed against the secondary memory unit 34 regardless whether they are read or write cycles. However, it will be appreciated that the present invention may be practiced without the read and write cycles to shadowed read-only memory being supported in the manner considered.

Continuing to refer to FIG. 1, as described earlier, the first level write through cache memory 14 of the present invention comprises a write through cache memory controller 14a and an array of cache memory 14b. The first level write through cache memory unit 14 is designed to cache cacheable data and instructions of both main and secondary memory 24 and 34. Regardless whether write cycles performed against the first level write through cache memory unit 14 result in write cache hits/misses, the write through cache controller 14a is designed to pass those write cycles to the local bus 18. More importantly, the first level write through cache memory unit 14 is optimized to provide a high cache read hit rate for read cycles performed by the CPU 12.

In particular, the first level write through cache memory unit 14 is designed to be responsive to the read and write cycles performed by the CPU 12. The first level write through cache memory unit 14 is designed to reallocate its cache lines in response to read cache misses due to read cycles performed by the CPU 12, but not for write cache misses resulted from write cycles performed by the CPU 12. However, except for performing snoop cycles in response to write cycles performed by the other direct memory accessing devices 32, the first level write through cache memory unit 14 is designed to be otherwise unresponsive to read and write cycles performed by the other direct memory accessing devices 32. Additionally, the first level write through cache memory unit 14 is designed to be n-way associative; preferably, 4-ways.

For ease of understanding the present invention, the first level write through cache memory unit 14 is assumed to be capable of burst filling its cache lines. The first level write through cache memory 14 is further assumed to support the caching of write protected memory, that is, read-only memory will be cached during read cycles, but once cached, write cycles against the cached read-only memory will always be considered write cache misses and the cached read-only memory will never be updated. However, it will be appreciated that the present invention may be practiced without the filling of cache lines and the caching of read-only memory being supported in the manner assumed. Otherwise, except for the design considerations specified herein, the first level write through cache memory unit 14 may be implemented with any well known cache memory.

Still referring to FIG. 1, as described earlier, the second level write back cache memory 20 comprises a write back cache controller 20a and an array of cache memory 20b. The write back cache controller 20a comprises control logics (not shown) and a write buffer (not shown). The second level write back cache memory unit 20 is designed to cache data of the main memory 24. The second level write back cache memory unit 20 is designed to drain dirty data stored in its cache lines into the main memory 24 only when its cache lines are about to be reallocated. More importantly, the second level write back cache memory unit 20 is optimized to complement the first level write through cache memory unit 14.

In particular, the second level write back cache memory unit 20 is designed to be responsive to both read and write cycles performed by the CPU 12 and the other direct memory accessing devices 32. However, the second level write back cache memory unit 20 is designed to reallocate its cache lines in response to cache write misses resulted from write cycles performed by the CPU 12 only, but not for cache read misses resulted from read cycles performed by the CPU 12, and not for cache read/write misses resulted from read/write cycles performed by the other direct memory accessing devices 32.

Additionally, the second level write back cache memory unit 20 is designed with cache lines having a line size greater than or equal to the line size of the cache lines of the first level write through cache memory unit 14. The second level array of cache memory 20b is designed to be relatively small as compared to the first level array of cache memory 14b. In their presently preferred form, the first and second level array of cache memory 14b and 20b have a size ratio of 8:1, for example, 8K for the first level array of cache memory 14b and 1K for the second level array of cache memory 20b. Furthermore, the second level write back cache memory unit 20 is also designed to be n-way set associative; preferably, also 4-ways. Similar to the first level write through cache memory unit 14, except for the design considerations specified herein, the second level write back cache memory unit 20 may be implemented with any well known cache memory.

Figure 2B:
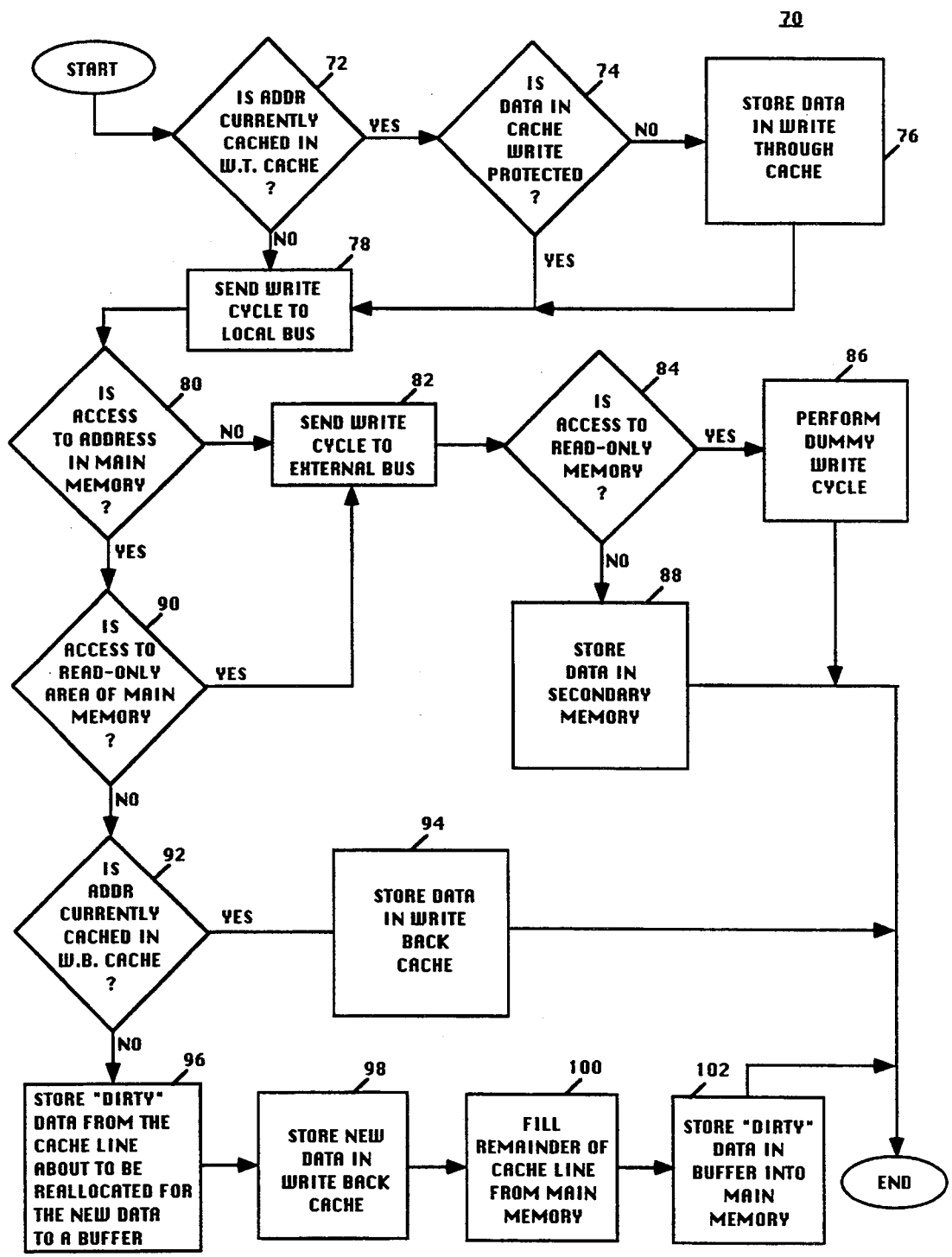
Figure 2C:
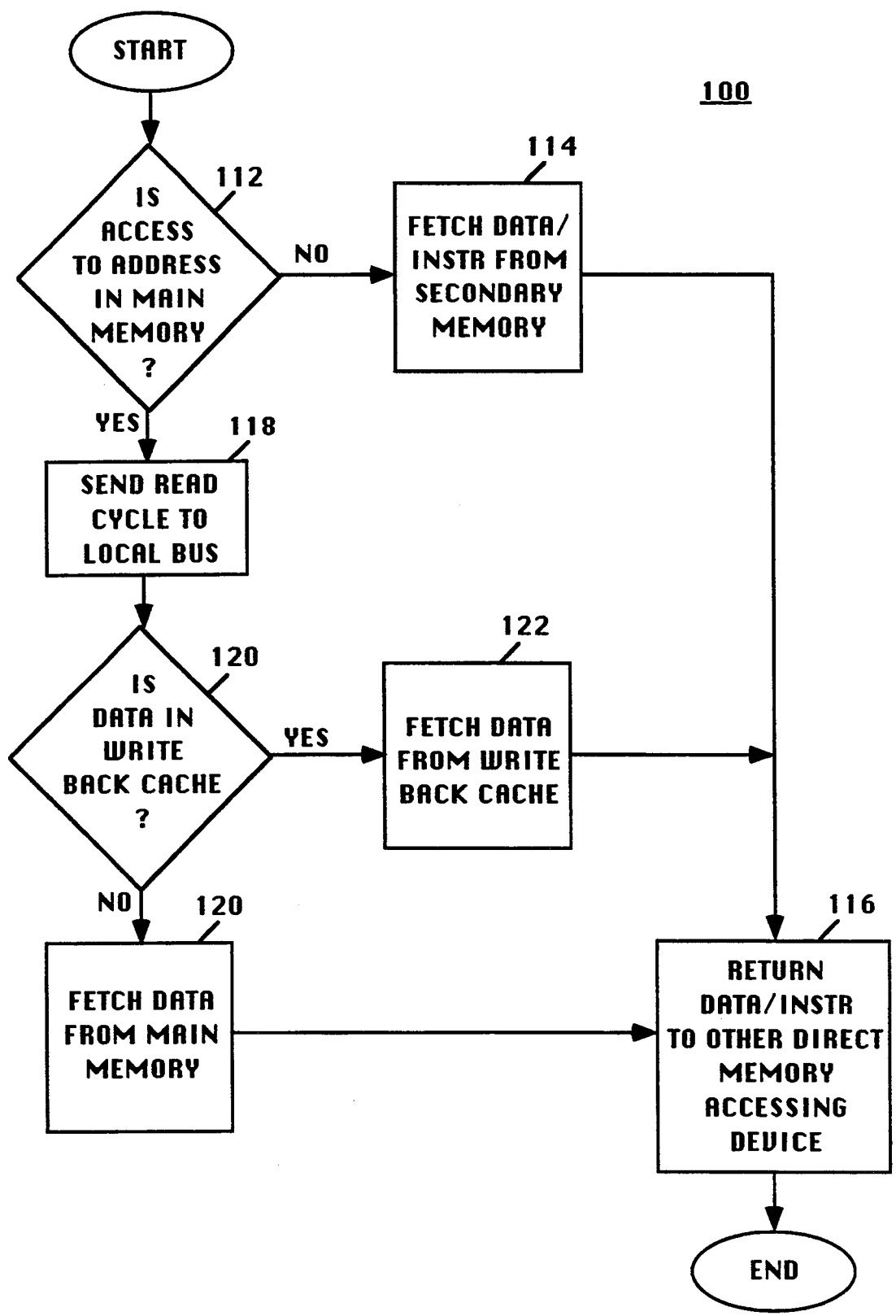
Figure 2D:
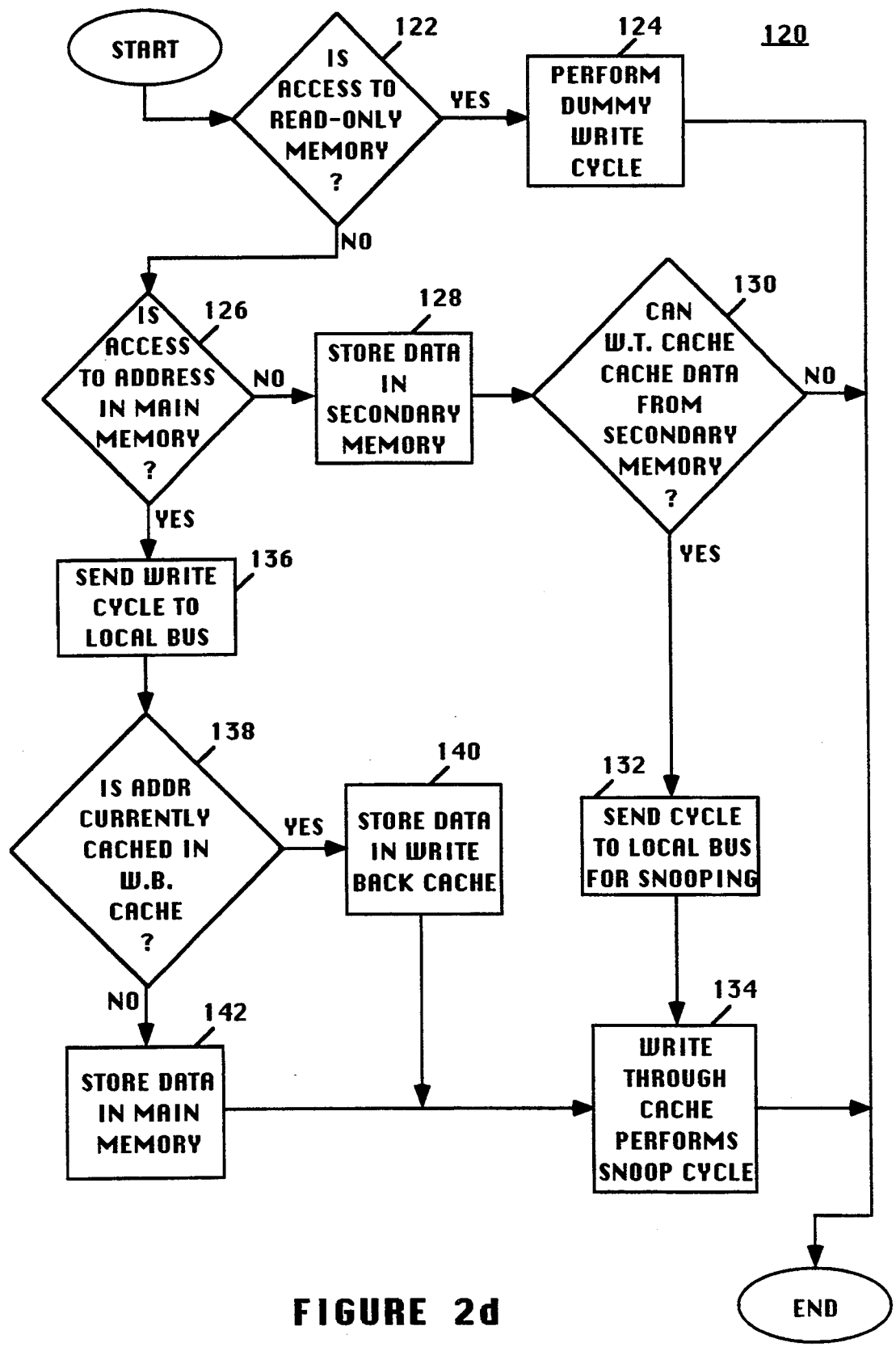

Referring now to FIGS. 2a–2d, four block diagrams illustrating the operation flow of the cache memory hierarchy of the present invention is shown. FIGS. 2a and 2b illustrate the operation flow for read and write cycles performed by the CPU. FIGS. 2c and 2d illustrate the operation flow for read and write cycles performed by the other direct memory accessing devices.

Referring first to FIG. 2a, initially, the first level write through cache memory unit determines if the data/instruction being fetched by the CPU is currently stored in the first level array of cache memory, block 42. If the data/instruction being fetched is currently stored in the first level array of cache memory, the data/instruction is fetched from the first level array of cache memory and return to the CPU, blocks 44 and 46. If the data/instruction being fetched is not currently stored in the first level of cache memory, the first level write through cache memory unit generates and sends a read cycle to the local bus, block 48.

If the read cycle does not address the main memory, the read cycle is either forwarded or defaulted to the external bus, block 52. Upon detection of the read cycle on the external bus, the secondary memory unit fetches the data/instruction from its array of memory, block 54. If the data/instruction is not cacheable, the data/instruction is fetched from the secondary memory unit and returned to the CPU, block 46, otherwise, the data/instruction is fetched from the secondary memory unit, stored in the first level write through cache memory unit and then returned to the CPU, blocks 58 and 46.

If the read cycle addresses the main memory, upon detection of the read cycle, the second level write back cache memory unit determines if the data/instruction is currently stored in its array of cache memory, block 60. If the data/instruction is currently stored in its array of cache memory, the data/instruction is fetched from there, stored into the first level write through cache memory unit and returned to the CPU, blocks 62, 58 and 46. Otherwise, the data/instruction is fetched from the main memory, stored in the first level write through cache memory unit and returned to the CPU, blocks 64, 58 and 46. As described earlier, the data/instruction fetched from the main memory is not stored in the second level write back cache memory unit.

Referring now to FIG. 2b, initially, the first level write through cache memory unit determines if the destination address of the write cycle being performed by the CPU is currently cached in its array of cache memory, block 72. If it is, the first level write through cache memory unit additionally determines if the data currently cached is write protected, block 74. If the data currently cached is not write protected, the data being written is stored into the cache line, block 76. Regardless whether the destination address is currently cached and/or write protected, the first level write through cache memory unit sends the write cycle to the local bus, block 78.

If the write cycle does not address the main memory, or addresses a read-only area of main memory, the write cycle is forwarded or defaulted to the external bus, block 82. Upon detection of the write cycle, the secondary memory unit determines if the write cycle addresses read-only memory, block 84. If the write cycle addresses read-only memory, the secondary memory unit performs a dummy write cycle, block 86, otherwise, the secondary, memory unit stores the write data into the secondary array of memory, block 88.

If the write cycle addresses an area of the, main memory that is not read-only, upon detection of the write cycle, the second level write back cache memory determines if the destination address is currently cached in its array of cache memory, block 92. If the destination address is currently cached in its array of cache memory, the write data is stored into the second level cache memory array, block 94. As described earlier, the write data is not drained into the main memory until a cache line is reallocated. If the destination address is not currently cached in the second level cache memory array, the second level write back cache memory unit selects a cache line to be reallocated, stores the dirty data from the selected cache line into the write buffer, block 96, stores the write data into the selected cache line, block 98, fills the remainder of the now reallocated cache line with data retrieved from main memory, block 100, and drains the dirty data in the write buffer into the main memory, block 102.

Referring now to FIG. 2c, initially, the external bus interface determines if the read cycle from one of the other direct memory accessing devices addresses the main memory, block 112. If the read cycle addresses the secondary memory, upon detection of the read cycle, the secondary memory unit fetches the data/instruction from its array of memory and returns the data/instruction to the other direct memory accessing device, blocks 114 and 116. As described earlier, the data/instruction is not fetched from the first level write through cache memory even if it is stored there, nor stored in the first level write through cache memory unit even if the fetched data/instruction is cacheable and not stored there.

If the read cycle addresses the main memory, the external bus interface forwards the read cycle to the local bus, block 118. Upon detection of the read cycle, the second level write back cache memory unit determines if the data/instruction being fetched is currently stored in its array of cache memory, block 120. If the data/instruction being fetched is currently stored in the second level array of cache memory, the second level write back cache memory unit fetches the data/instruction and returns the data/instruction to the other direct memory accessing device, blocks 122 and 116. Otherwise, the data/instruction is fetched from the main memory and returned to the other direct memory accessing device, blocks 124 and 116. As described earlier, the fetched data/instruction from main memory is not stored in the second level write back cache memory unit. The data/instruction is neither fetched from the first level write through cache memory unit even if the data/instruction is stored there, nor stored in the first level write through memory even if the fetched data/instruction is not stored there.

Referring now to FIG. 2d, initially, the, external bus interface determines if a write cycle from one of the other direct memory accessing devices addresses read-only memory of the secondary memory, block 122. If the write cycle addresses read-only memory of the secondary memory, upon detection of the write cycle, the secondary memory unit performs a dummy write cycle, block 124. Otherwise, the external bus further determines if the write cycle addresses the main memory, block 126. If the write cycle does not address the main memory, upon detection of the write cycle, the secondary memory unit stores the write data into its array of memory, block 128.

Additionally, if the destination address is cacheable by the first level write through cache memory, the bus cycle is forwarded to the local bus for snooping, block 132. Upon detection of the bus cycle for snooping, the first level write through cache memory performs the snoop cycle, that is, determining if the destination address is currently cached in its array of cache memory, and if so, invalidating the cache line, block 134. As described earlier, the data written into the secondary memory is not stored in the first level write through cache memory unit even if the secondary memory location is a cacheable memory location.

If the write cycle addresses the main memory, the external bus interface forwards the write cycle to the local bus, block 136. Upon detection of the write cycle, the second level write back cache controller determines if the destination address is currently cached in the second level of cache memory array, block 138. If the destination address is currently cached in the second level cache memory array, the data is stored into the second level write back cache unit, block 140, otherwise, the data is stored into the main memory, block 142. As described earlier, the second level cache memory unit does not reallocate its cache lines for write misses resulted from write cycles performed by the other direct memory accessing devices, and dirty data stored in the second level cache memory array is drained into the main memory only when a cache line is reallocated.

Regardless, whether the data is stored into the second level array of cache memory or the main memory, upon detection of the write cycle on the local bus, the first level write through cache memory unit performs a snoop cycle, block 134, invalidating the cache line corresponding to the destination address if the destination address is currently cached in the first level write through cache memory. As described earlier, the data is not written into the first level write through cache memory regardless whether the destination address is currently cached there or not.

Referring back to FIG. 1, as a result of the design considerations and operation flow described earlier, the cache memory hierarchy of the present invention achieves the desired results and objects outlined in the background section. It will be appreciated that by designing the second level write back cache memory unit 20 to reallocate its cache lines for write misses resulted from write cycles performed by the CPU 12, and not reallocate its cache lines for write misses resulted from write cycles performed by the other direct memory accessing devices 32, nor read misses resulted from read cycles performed by either the CPU 12 or the other direct memory accessing devices 32, the second level write back cache memory 20 may be implemented in a simplified manner without the need for any of the well known industry protocol such as Modified Exclusive Shared Invalid (MESI), or Modified Owned Exclusive Shared Invalid (MOESI). As a result, the desired result and object of reducing power consumption by reducing accesses to main memory without having to forsake the simple to implement write through cache memory is achieved.

It will also be appreciated by optimizing the first level write through cache memory to provide a high cache hit rate for read cycles performed by the CPU 12, the majority of the remaining bus cycles addresses to main memory 24 as a result of cycles performed by the CPU 12 will be write cycles. Thus, the size of the second level write back cache memory 20 can be optimized to allocate its cache lines for write misses resulted from CPU write cycles and have its size kept small as compared to the first level write through cache memory 14, thereby achieving the desired result and object of reducing power consumption by reducing access to main memory without having the power consumption savings negated by offsetting increases in power consumption by additional hardware.

It will also be appreciated that since the first level write through cache memory 14 is optimized to provide a high cache hit rate for read cycles performed by the CPU 12, the performance penalty resulted from keeping the second level write back cache memory 20 small and not reallocating cache lines in response to cache read misses resulted from read cycles performed by the CPU 12 and the other direct memory accessing devices 32 is insignificant. Additionally, by providing the second level write back cache memory 20 with cache lines having the same size as the cache lines of the first level write through cache memory, the cache lines of the first level write through cache memory unit 14 may be burst filled, and multiple hit/miss determinations at the second level write back cache memory unit 20 are avoided. As a result, the desired result and object of the present invention of reducing power consumption by reducing accesses to main memory without significant increase in performance penalty is achieved.

While the cache memory hierarchy of the present invention has been described in terms of its presently preferred form and various assumptions, those skilled in the art will recognize that the cache memory hierarchy of the present invention is not limited to the presently preferred form described and the assumptions made. The cache memory hierarchy of the present invention may be practiced with modification and alteration within the spirit and scope of the appended claims. Thus, the specification is to be considered as illustrative instead of restrictive on the present invention.

What is claimed is:

1. In a data processing system, first and second levels of a cache memory hierarchy comprising;
   (a) a write through (WT) cache memory, at the first level of the cache memory hierarchy for
      (i) caching a first subset of data stored in a main memory:
      (ii) allowing read accesses by a processor and write accesses by said processor, as well as snoop accesses by direct memory access (DMA) devices; and
      (iii) modifying the contents of said WT cache memory only in response to indications of read misses of said read accesses, by implementing a first allocation policy wherein for each of said read miss indications, said first subset of data stored in the WT cache memory is modified by replacing a line of data in the first subsist with a new line of data from the main memory, said new line of data from the main memory having been the subject of the missed read access; and
   (b) a write back (WB) cache memory, at the second level of the cache memory hierarchy, for
      (i) caching a second subset of data stored in said main memory;
      (ii) allowing read accesses by said processor and write accesses by said processor, as well as read accesses by said DMA devices and write accesses by said DMA devices; and
      (iii) modifying the contents of said WB cache memory only in response to indications of write misses of said write accesses by said processor, by implementing a second allocation policy wherein for each of said write miss indications, said second subset of data stored in the WB cache memory is modified by replacing a line of data in the second subset with a new line data from the processor, said new line of data from the processor having been the subject of the missed write access.

2. The cache memory hierarchy as set forth in claim 1, wherein said WT cache memory at the first level of the cache memory hierarchy having a first cache size designed to provide a high cache hit rate, whereas said WB cache memory at the second level of the cache memory hierarchy having a second cache size, complementary to said first cache size, designed merely to reduce write accesses to said main memory.

3. The cache memory hierarchy as set forth in claim 2, wherein said first cache size is substantially larger than said second cache size.

4. The cache memory hierarchy as set forth in claim 3, wherein said first cache size is about eight times larger than said second cache size.

5. The cache memory hierarchy as set forth in claim 1, wherein said WT cache memory at the first level of the cache memory hierarchy and said WB cache memory at the second level of cache memory hierarchy are n-way set associative cache memory.

6. A computer system comprising:

a) a central processing unit (CPU) for executing instructions;
b) a main memory for storing instructions and data;
c) a peripheral device for providing periphery functions that makes direct memory accesses;
d) first and second levels of a cache memory hierarchy coupled to said CPU, said main memory and said peripheral device having
   1) a write through (WT) cache memory at the first level of the cache memory hierarchy for
      (i) caching a first subset of instructions and data stored in said main memory;
      (ii) allowing read accesses by said CPU and write accesses by said CPU as well as snoop accesses by said peripheral device; and
      (iii) modifying the contents of said WT cache memory only in response to indications of read misses of said read accesses by said CPU, by implementing a first allocation policy wherein for each of said read miss indications, said first subset of data stored in the WT cache memory is modified by replacing a line of data in the first subset with a new line of data from the main memory, said new line of data from the main memory having been the subject of the missed read access; and
   2) a write back (WB) cache memory at the second level of the cache memory hierarchy for
      i) caching a second subset of instructions and data stored in said main memory;
      (ii) allowing read accesses by said CPU and write accesses by said CPU as well as read accesses by said peripheral device and write accesses by said peripheral device; and
      (iii) modifying the contents of said WB cache memory in response to indications of write misses of said write accesses by said processor, by implementing a second allocation policy wherein for each of said write miss indications, said second subset of data stored in the WB cache memory is modified by replacing a line of data in the second subset with a new line data from the processor, said new line of data from the processor having been the subject of the missed write access.

7. The computer system as set forth in claim 6, wherein said WT cache memory at the first level of the cache memory hierarchy having a first cache size designed to provide a high cache hit rate, whereas said WB cache memory at the second level of the cache memory hierarchy having a second cache size, complementary to said first cache size, designed merely to reduce write accesses to said main memory.

8. The computer system as set forth in claim 7, wherein said first cache size is substantially larger than said second cache size.

9. The computer system as set forth in claim 8, wherein said first cache size is about eight times larger than said second cache size.

10. The computer as set forth in claim 6, wherein said WT cache memory at the first level of the cache memory hierarchy and said WB cache memory at the second level of the cache memory hierarchy are n-way set associative cache memory.

* * * * *

UNITED STATES PATENT AND TRADEMARK OFFICE
CERTIFICATE OF CORRECTION

PATENT NO. : 5,359,723
DATED : October 25, 1994
INVENTOR(S) : Mathews et al.

It is certified that error appears in the above-identified patent and that said Letters Patent is hereby corrected as shown below:

In column 2 at line 25 delete "memoir" and insert --memory--

In column 3 at line 15 delete "which" and insert --which:--

In column 7 at line 36 delete "secondary, memory" and insert --secondary memory--

In column 7 at line 38 delete "the, main" and insert --the main--

In column 8 at line 24 delete "the, external" and insert --the external--

In column 10 at line 10 delete "comprising;" and insert --comprising:--

In column 10 at line 14 delete "memory;" and insert --memory:--

In column 10 at line 26 delete "subsist" and insert --subset--

UNITED STATES PATENT AND TRADEMARK OFFICE
CERTIFICATE OF CORRECTION

PATENT NO. : 5,359,723
DATED : October 25, 1994
INVENTOR(S) : Mathews et al.

It is certified that error appears in the above-indentified patent and that said Letters Patent is hereby corrected as shown below:

In column 10 at line 26 delete "subsist" and insert --subset--

Signed and Sealed this

Nineteenth Day of November, 1996

Attest:

BRUCE LEHMAN

*Attesting Officer*   *Commissioner of Patents and Trademarks*